United States Patent Office 3,171,159
Patented Mar. 2, 1965

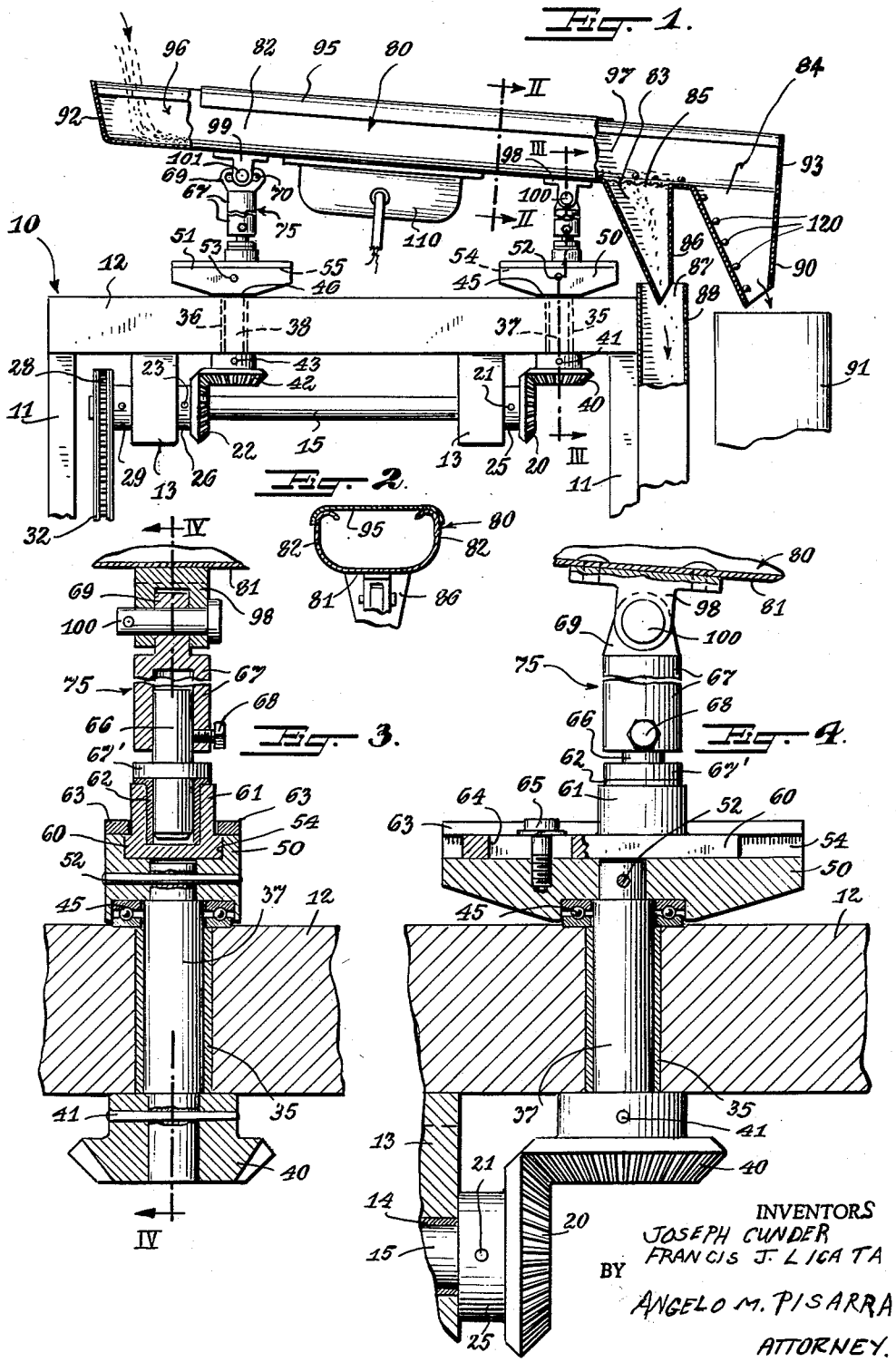

3,171,159
PELLETIZED WATER INSOLUBLE METALLIC SOAPS AND METHODS AND APPARATUS FOR PRODUCING THEM
Joseph Cunder, East Orange, and Francis J. Licata, West Caldwell, N.J., assignors to Nopco Chemical Company, Newark, N.J., a corporation of New Jersey
Filed Aug. 9, 1961, Ser. No. 130,380
7 Claims. (Cl. 18—1)

This invention is directed to novel methods and apparatus for producing certain compositions of matter into new and novel physical forms. In one of its more specific aspects the invention is directed to novel methods and apparatus for making pellets or spheroids from certain powdered or finely divided salts or soaps of certain fatty acids, and to the novel pellets or spheroids produced.

Salts or soaps of fatty acids have long been known and have found use in a number of different fields. Some of them are water-soluble and have found application in the laundry, cosmetic, and other fields. Others are water-insoluble, are hydrophobic and have found application in the field of lubrication, and other fields well known to the art. In some instances the water insoluble hydrophobic soaps or salts have been mixed with certain fractions of petroleum oils and then heated together for solution or dispersion after which the mass has been cooled to provide a lubricating grease.

This invention is concerned with water-insoluble hydrophobic soaps and especially with a limited group of them. It has long been known to the art that many of the water-insoluble hydrophobic soaps are sold and shipped commercially in the form of fine powders in various types of containers; and that these powders in the main are fluffy, flocculent and/or dusty in nature, and also tend to adhere to the surfaces of chutes and containers.

Due to their being fluffy or flocculent, they are bulky and therefore present an economic factor in shipping; and due to their dusty character, when used by the consumer, they sometimes present a health hazard and in the absence of great precaution frequently contaminate other materials in the same plant in which they are used.

In our experimentations with said soaps or salts, we have discovered that some of them, due to their physical and electrostatic condition at the surface may be treated to convert said soaps, which are in powdered or finely divided condition, into a form in which the bulkiness thereof has been considerably reduced. The foregoing we have accomplished without resort to the use of any extraneous material to act as a binder so that the chemical nature of the soap is not affected. In addition the foregoing is readily accomplished in a ready and facile manner by our novel apparatus which is relatively inexpensive to make, is rugged and requires very little control even by an unskilled operator.

We have discovered that a limited class of metallic soaps, namely the aluminum, zinc, magnesium, cadmium and barium soaps of fatty acids which consist essentially of saturated fatty acids of 12–18 carbon atoms, which normally are bulky and dusty when in finely divided or powdered form may be pelletized by following the novel methods of this invention thereby to provide approximately spheroidal pellets which are self sustaining, non-adherent with respect to each other, free-flowable and capable of normal storage and shipping without any appreciable disintegration, and are pourable without creating the dust normally attendant the pouring of said material when in a free flowing powdered condition, simulating flour.

This invention in one of its aspects is predicated upon our discovery that a mass consisting of one or a combination of two or more of said metallic soaps of the class hereinbefore defined and being in such finely divided condition that at least 90% by weight thereof is passable through a 200 mesh screen, may, while in the dry state and without the addition of any material to serve as a binder, be converted into self-sustaining substantially spheriodal pellets which may be of predetermined sizes, are non-adherent with respect to each other and therefore are free flowing, are capable of being stored and shipped under normal conditions without appreciable breakdown or disintegration of the pellets, and are of greater density than the original mass thereby reducing the bulkiness thereof, and are capable of being used by the consumer without any appreciable dusting and also by the action of appropriate agitators, such as a rotary blade agitator may be disintegrated into substantially its initial powdered state when so desired by the consumer as for example after added to a petroleum fraction in the course of combining said soaps therewith in the production of greases and the like.

The novel substantially spheroidal products of this invention which are substantially dustless, and possess the other significantly advantageous commercial characteristics of size and density, may be produced by subjecting said particles to impact with respect to each other, that is some of the particles strike other particles thereby to exert pressure upon the struck particles resulting in electrostatic and or physical cohesion between individual particles. And such newly formed multi-particle combinations, like the other individual particles are in motion whereby they also strike other individual particles and/or multi-particle combinations in many directions, and thus by such impact pressure cause a build up of the multi-particle combinations, while other of said multi-particles combinations are being formed. By subjecting the original finely divided mass to agitation, and preferably agitation in a number of different directions, as for example in roughly circular type paths, and with the particles also moving up and down in a vertical path at an angle to the various circular paths and also in a path which is roughly linear and in a horizontal or inclined path, the powdered mass may be converted to such pellets of the desired size which may vary from $\frac{1}{32}''$ to $\frac{1}{4}''$ or more in diameter.

The mechanism of such pellet formation of the aforesaid particular limited class of metallic soaps is difficult to explain. We have discovered that we may form pellets of only such finely divided particles of said limited class of soaps which are in such physical condition that when a limited quantity thereof is maintained against the vertical surface of a container such as a cardboard container with just sufficient force to prevent the falling thereof, and then when said force is removed, said mass will exhibit some lumping or agglomeration. This visual physical change under the aforesaid condition from a free flowing "flour-like" powder to a lumpy mass indicates that the individual particles of said powdered soaps carry certain electrostatic charges and due to said charges coupled with some physical interlocking of the fine particles, lumps are formed. We have discovered that some of the metallic soaps employed herein are so characterized after being produced, while other such as aluminum stearates, for example are not so characterized, and in that state cannot be pelletized without first being subjected to a pre-treatment. A pre-treatment thereof which we have found effective to so characterize said aluminum stearates are jet milled by subjecting them to the action of a jet milling device of the type known as Sturtevant Micronizer Grinding Maching Bulletin 091. By virtue of such jet milling treatment said aluminum stearates have been conditioned so that now they also will exhibit lumpiness or agglomeration when like the other soaps, limited quantities thereof are maintained against the smooth vertical surface of a cardboard container with just sufficient force to prevent the falling thereof, and then when said force is removed, said mass will exhibit some lumping or agglomeration. This change in said aluminum stearates, we believe to be due to the fact that the jet milling of the particles thereof has caused or induced a change in the electrostatic condition of the particles, especially on the surface thereof. We believe that the agglomerative tendency of said jet milled aluminum stearates as well as the other soaps pelletized herein is due at least in part to minute disarrangement of the molecular pattern at the surface of each particle thereby to create potential electrostatic forces. These electrostatic forces may be of a varying positive and negative quantity depending upon the physical and chemical characteristics of the material and the surfaces thereof.

By jet milling said aluminum stearate powders, the particles thereof are impelled by high speed air jets located near the periphery of the cylindrical grinding chamber. The jet propelled particles moving in high speed rotation reduce each other in size by violent impact among themselves, and on the surface of the chamber. Such jet milling also reduces the air space or air cushion between the individual very small particles which make up the particles of said powder being jet milled. The air pockets or cushions are reduced by imparting a substantial velocity in jet milling so that sufficient momentum and pressure of contact are developed to squeeze out or expel the air pockets or cushioning in said material at least at and around the points of contact.

The main object of the present invention is to provide said limited class of soaps in pelletized form, with the pellets being self-supporting or self-sustaining and being substantially non-adherent with respect to each other and other surfaces in general so that they may be readily discharged from a container without appreciable dusting, and also by the use of appropriate devices are capable of being disintegrated into fine particles.

Another object of this invention is to provide a novel method and apparatus for producing said pellets.

The foregoing as well as other objects and advantages of this invention will be readily apparent from the following description and drawings, wherein:

FIG. 1 is a fragmentary view in side elevation and partly in section of an illustrative embodiment of the present invention.

FIG. 2 is a cross-sectional view taken on line II—II of FIG. 1.

FIG. 3 is an enlarged partially cross-sectional view taken on line III—III of FIG. 1.

FIG. 4 is an enlarged partially cross-sectional view taken on line IV—IV of FIG. 3.

As shown in FIG. 1 there is a support 10 which may be in the form of a table consisting of a plurality of legs 11 carrying a top 12 at the upper ends thereof and a bottom (not shown) at the lower end thereof thereby to provide a rigid unitary support 10. Mounted on the bottom face of the top 12 and depending therefrom are a pair of identical bearing supports 13 spaced from each other. Mounted in each of the supports 13 is a bushing 14 extending therethrough. Extending through bushings 14 and beyond the outer faces of both of the bearing supports 13 is a rotatable shaft 15. A bevel gear 20 is mounted on said shaft 15 at one end thereof and is fixedly secured thereto by a pin 21 and is disposed adjacent the outer vertical face of one of the bearing supports 13. An identical bevel gear 22 is mounted on said shaft 15 and is fixed thereto by a pin 23 and is disposed adjacent the inner vertical face of the other bearing support 13. Each of the bevel gears 20 and 22 have enlarged short collars 25 and 26 respectively integral therewith and through which said locking or holding pins are inserted. The faces of said collars 25 and 26 respectively bear against the outer vertical face of one of the supports 13 and the inner vertical face of the other support 13 to prevent any appreciable linear movement of shaft 15, in one direction. The other end of shaft 15 has a sprocket gear 28 fixedly secured thereto and spaced from the outer vertical face of a support 13. Also fixedly secured to said shaft 15 and disposed between the gear 28 and the outer face of support 13 is a short collar 29. The inner face of collar 29 bears against the outer face of support 13 and cooperating with the collars 25 and 26 respectively bearing against the outer face of a support 13 and the inner face of the other support 13 prevents appreciable linear movement of shaft 15 in any direction while permitting shaft 15 to rotate freely in supports 13. Mounted on the table 12 bottom (not shown) is an electric motor (not shown) having a drive shaft operatively connected to the shaft 15 by a link belt or chain 32 operatively associated with sprocket 28 and the not shown sprocket on the drive shaft of the electric motor, which is a variable speed motor.

The top 12 of the support or table 10 has a pair of vertically disposed spaced openings extending therethrough and in which are disposed identical bushings 35 and 36. Extending through the parallel bushings 35 and 36, respectively are short shafts 37 and 38, both extending above and below the top 12. A bevel gear 40 whose teeth mesh with those of the bevel gear 20 is carried by and fixedly secured to the shaft 37 at the lower end thereof by a holding or locking pin 41. In like manner an identical bevel gear 42 whose teeth mesh with those of gear 22 is carried by and fixedly secured to shaft 38 at the lower end thereof by a holding or locking pin 43. The upper ends of said shafts 37 and 38 extend through central openings in ball bearing races 45 and 46 and into central openings in identical heads 50 and 51. The heads 50 and 51 are recessed and mounted on top of said races 45 and 46 and are fixedly secured to upper ends of the respective shafts 37 and 38 by locking pins 52 and 53. Said heads 50 and 51 respectively have identical horizontal slots 54 and 55. Said slots 54 and 55 are in the same horizontal plane disposed at right angles to the vertical axes of the shafts 37 and 38 which are parallel to each other.

Located in each of said slots 54 and 55 is a cross bar 60 having a short cylindrical journal 61 integral therewith and extending upwardly therefrom. Mounted in each of said journals 60 is a bushing 62. Each of said cross bars 60 is maintained against vertical displacement in its slot by a pair of flanges 63. Each of said cross bars 60 has an elongated opening 64 extending therethrough and is slideably mounted in its slot. A locking nut 65 extends through the opening 64 and makes threaded engagement with head 50 or 51 for locking the particular cross bar in any desired position to that head.

By varying the position or location of the bars 60 which are adjustable by use of the locking bolts 65, the distance between the vertical center lines of respective shafts 37 and 38 with respect to the vertical center lines of the journals 61 may be varied thereby to vary the magnitude of eccentricity therebetween. And consequently, the diameter of the circles in which the journals 61 are revolvable may be varied.

In this embodiment of the invention as shown in FIG. 1, the identical heads 50 and 51 are originally in alignment, with the slots 54 which are identical being in a single horizontal plane and being in perfect alignment with each other. Also in every instance the eccentricity or the distance between the vertical center line of a journal 61 and the vertical center line of the shaft 37 is always the same as the vertical center line of the other journal 61 and the shaft 38 so that the diameter of the circle of revolution of both journals 61 is always identical.

Mounted for free riding in each of the journals 61 and located in the bushing 62 therein is a vertically adjustable upright support or standard 75. Each of said standards consists of a solid cylinder 66 having a resting or supporting collar 67' integral therewith intermediate the ends thereof. One end of the cylinder 66 is inserted into the bushing 62 and makes a slip-fit therein. The collar 67' rests upon the bushing 62 to support said cylinder 66. Mounted on the upper end of cylinder 66 is a hollow tubular element 67 closed at its top and terminating in an ear 69 having an elongated opening 70 therein. Said tubular element has a locking bolt 68 making threaded engagement with a threaded opening therein and serves to lock said elements 66 and 67 to each other in any of the desired adjusted positions.

Disposed above the lengthwise adjustable standards 75 is an elongated trough 80 which in vertical cross section is in the approximate form of a U, or is parabolic or semicircular, and in the illustrative embodiment shown it is in approximately U form. The trough 80 comprises a bottom 81 and sides 82, with one end of the bottom 81 having a plurality of spaced openings 83 and 84 therethrough and extending substantially the full width of bottom 81.

Extending across the opening 83 is a screen 85, and depending from said bottom 81 is a chute 86 whose discharge end is located in the mouth 87 of a container 88 demountably coupled by any convenient means to the support 10 at one end thereof. A chute 90 is located at mouth 84, is secured to the bottom 81, and its discharge end is disposed in the open end of a container 91 which may be a shipping container. One end of the trough 80 is closed by an end piece 92 secured to the sides 82 and bottom 81 and its other end is closed by an end piece 93 which is an extension of a side of chute 90.

A cover 95 is demountably secured to said trough 80, and is of such length to provide an opening 96 at one end thereof through which material to be treated may be fed into the trough 80 and an opening 97 at the other end through which an operator may visually determine the efficacy of the apparatus when in use.

Secured to the bottom 81 of the trough 80 are two pairs of ears 98 and 99 having openings therethrough respectively in registery with the openings 70 in the ears 69. Locking pivots 100 and 101 extend through said openings to couple the standards 75 to the trough 80. If desired, an electric vibrator 110 for producing strong impulses to the trough 80 may be mounted on the bottom of the trough 80 as shown or it may be mounted on the end piece 92. The vibrator 110 may be of any conventional make, such as that sold under the trade name "Syntron Type F1."

The trough 80 may be a single element as shown or it may be a two-piece unit, with each piece being of substantially the same length with adjacent ends overlapping. In such an embodiment, the free end of the left hand portion or piece which is that piece or portions into which the powdered material is first fed, terminates in a free end of smaller size and at this end may be of a resilient rubber. This short resilient rubber element overlaps the free end of the right hand portion or piece which carries the chutes at the end thereof. In such a two piece embodiment, the cover plate is omitted and the respective pieces of the trough 80 are substantially independent of each other and are independently supported by the respective standards 75. Thus, one standard 75 supports one of said pieces of a two piece trough and the other standard 75 supports the other piece of the two piece trough. The individual pieces of said two piece trough may be adjusted at different angles to the horizontal by locking pivots 100 and 101 so that the speed of travel and build up of pellets in each of the two pieces may be varied depending upon the will of the operator and the size and speed of pellet formation. In this two-piece trough embodiment, the vibrator 110 is secured to the end 92.

Also if desired, the embodiment shown in FIG. 1 may be modified by omitting one of the standards 75, a head 50 and its drive shaft 37, so that the trough 80 is supported by a single standard 75. In such an embodiment only one set of gears, namely 20 and 40 are employed.

Of course, various other changes and modifications of the apparatus may be made without departing from the spirit of this invention.

The operation of my novel apparatus is as follows: The locking bolts or pivots 100 and 101 are loosened, as are either one or both of the locking screws 68 and the length or lengths of the telescoping or linearly vertically adjustable standards 75 are adjusted by movement of element 67 with respect to element 66 so that the trough is disposed at the required or desired angle to the horizontal depending upon the particular material being treated and the size of the novel pellets desired. Then said locking bolts 100 and 101 and locking bolts 68 are tightened thereby to lock and maintain the trough 80 in said adjusted inclined position. The screws 65 may be loosened and the respective cross bars 60 may be moved the same distance from the center lines of the shafts 37 and 38, the required distance and then the screws 65 are tightened. In this manner the desired eccentricity may be set. The apparatus is now set for operation.

The motor (not shown) is energized to drive the chain 32 which cooperating with sprocket 28 drives shaft 15. The shaft 15 drives the gears 20 and 22 which in turn drive gears 40 and 42 which drive the shafts 37 and 38. The rotating shafts 37 and 38 drive heads 50 and 51 which in turn revolve the standards 75 which are eccentric with respect to shafts 37 and 38 thereby to move standards 75 in a circular path whereby the trough 80 vibrates in a somewhat circular path imparted thereto by the motion of standards 75. While the apparatus is in operation, the powdered metallic soap to be pelletized is fed into the upper end of the trough 80 through opening 96. The powdered soap reaches the bottom 81 and becomes a layer thereof thereon. Due to the motion of the trough 80, the particles of powdered soap travel back and forth, and also vertically upwardly and downwardly and also in a direction towards the lower or chute end of the trough 80.

In the course of such movement, the particles of soap due to their electrostatic potential and surface-physical characteristics and by impact caused by the impulses exerted thereon by movement or vibration of the trough imparted thereto by standards 75 strike other particles thereby to become attached to each other. This action continues as well as a rolling action causing further agglomeration or build up of the powdered material with ultimated production of spheroids of the desired size which in general are about $\frac{1}{32}''$ up to $\frac{1}{4}''$ or more in diameter. In general the greater the angle of the trough 80 to the horizontal, the smaller is the average diameter of the spheroids produced. As the powdered or finely divided soap is fed into the trough 80, and this may be continuous if desired, it feeds slowly along the length of the trough and the spheroids first become formed and increase in size along the length thereof. The spheroids 120 together with some very small spheroids as well as powdered material pass along to the screen 85, and that portion thereof which is less than the desired diameter, passes through the screen 85 whose mesh is determined by the size of the spheroids desired. Those of the desired size pass through the chute 90 into the container 91, while the remainder of less than the desired size passes through the screen 85, into and through chute 86 and into container 88 and may be re-processed to convert same into spheroids of the desired size.

By employing the foregoing apparatus in the manner heretofore described and with or without the use of vibrator 110 and having the trough 80 disposed at an angle of approximately 15 degrees to the horizontal we have produced $\frac{1}{4}''$ pellets of cadmium stearate which were self sustaining, substantially dust-less, free flowing, non-adherent, and when packed for storage and transportation were resistant to disintegration. By subjecting cadmium stearate to the method heretofore disclosed, the container 91 would be filled with such pellets the greater proportion and in general at least 80% of which by weight measured at least 3/16″ in diameter.

The jet milled aluminum stearates also were treated in the manner heretofore described and there were produced novel pellets having a diameter of approximately 1/32″ and having the characteristic before set forth.

All of said other salts or soaps of said fatty acids as herein defined when subjected to said treatment in said apparatus as therein described may be pelletized to provide novel pellets.

In the operation of the specific illustrative embodiment of the invention as shown in the drawings said trough 80 is revolved about an axis which is in a vertical plane and disposed at right angles to the longitudinal axis of the trough 80.

Since certain changes in carrying out the aforementioned methods and in the constructions set forth, which embody the invention, may be made without departing from its scope, it is intended that all matter contained in the description or shown in the accompanying drawings shall be interpreted as illustrative and not in a limiting sense.

It is also to be understood that the following claims are intended to cover all the generic and specific features of the invention herein described and all statements of the scope of the invention, which as a matter of language might be said to fall therebetween; and that they are intended to be inclusive in scope and not exclusive, without departing from the spirit of the invention. Particularly it is to be understood that in said claims, ingredients or components recited in a singular are intended to include compatible mixtures of said ingredients wherever the sense permits.

We claim:

1. Apparatus for pelletizing to at least 1/32″ water-insoluble, hydrophobic metallic soap of saturated fatty acids of 12–18 carbon atoms, said metallic soap being in such finely divided condition that at least 90% by weight thereof is passable through a 200 mesh screen, comprising an inclined trough for supporting said soap to be pelletized, means for supporting said trough, said means including an eccentric, means for driving said eccentric to revolve said trough about an axis located in a vertical plane and disposed at right angles to the longitudinal axis of said trough thereby to cause said particles to move in a curvilinear path whereby different individual particles become coupled together to form spheroids of at least 1/32″, and means for varying the inclination of said trough to vary the residence time of the spheroids in the course of being formed therein, the surface of said trough, on which said soap is supported and along which it will be pelletized by the movement imparted thereto by the action of said eccentric thereon, being imperforate, the surface of said trough on which said soap is supported and along which it will be pelletized by the movement imparted thereto by the rotary movement thereof is imperforate.

2. Apparatus for pelletizing to at least 1/32″ water-insoluble, hydrophobic metallic soap of saturated fatty acids of 12–18 carbon atoms, said metallic soap being in such finely divided condition that at least 90% by weight thereof is passable through a 200 mesh screen, comprising an inclined elongated trough for supporting said soap to be pelletized, a head, means for rotating said head, a support secured to said head, with the vertical axis thereof spaced from the axis of rotation of said head to revolve said support upon rotation of said head with the axis of revolution of said trough being in a vertical plane and disposed at right angles to the longitudinal axis of said trough thereby to cause said particles to move in a curvilinear path whereby different individual particles become coupled together to form spheroids of at least 1/32″, means adjustably connecting said trough to said support for varying the inclination of said trough.

3. Apparatus for pelletizing water-insoluble hydrophobic metallic soap of saturated fatty acid of 12–18 carbon-atoms, said metallic soap being in such finely divided condition that at least 90% by weight thereof is passable through a 200 mesh screen, comprising an elongated trough for supporting said soap to be pelletized, means for supporting said trough, one end of said trough being open for the entry of said finely divided soap into said trough, the other end of said trough having a plurality of openings in the bottom thereof, a screen covering one of said plurality of openings located closer to the center of said trough than the other of said plurality of openings to screen out said soap of less than predetermined size and to permit the passage thereover to the next of said openings of pelletized soap of at least said predetermined size, said trough being inclined, with the inclination of said trough being variably adustable at will to vary the speed of travel of the soap being pelletized along the length of said trough, means for revolving said trough in a curvilinear path about an axis located in a vertical plane and disposed at approximately right angles to the longitudinal axis of said trough thereby to cause said particles to move in a curvilinear path whereby different individual particles become coupled together to form spheroids of at least 1/32″, said last mentioned means including means for at will varying the diameter of revolution of said trough, and means for varying the speed of said revolution, the surface of said trough on which said soap is supported and along which it will be pelletized by the movement imparted thereto by the rotary movement thereof is imperforate.

4. Apparatus for pelletizing water-insoluble hydrophobic metallic soap of saturated fatty acid of 12–18 carbon atoms, said soap being in such finely divided condition that at least 90% by weight thereof is passable through a 200 mesh screen comprising an inclined elongated trough for supporting said soap to be pelletized, a plurality of rotatable heads, spaced from each other, supports connected at one end to said trough and at their other end to said respective heads, means for simultaneously rotating said heads to revolve said supports thereby to revolve said trough about an axis located in a vertical plane and disposed at right angles to the longitudinal axis of said trough thereby to cause said particles to move in a curvilinear path whereby different individual particles become coupled together to form spheroids of at least 1/32″, the surface of said trough on which said soap is supported and along which it will be pelletized by the movement imparted thereto by the rotary movement thereof is imperforate.

5. Apparatus for pelletizing water-insoluble hydrophobic metallic soap of saturated fatty acid of 12–18 carbon atoms, said soap being in such finely divided condition that at least 90% by weight thereof is passable through a 200 mesh screen comprising an inclined elongated trough for supporting said soap to be pelletized, a plurality of rotatable heads, spaced from each other, supports connected at one end to said trough and at their other end to said respective heads, means for simultaneously rotating said heads to revolve said supports thereby to revolve said trough about an axis located in a vertical plane and disposed at right angles to the longitudinal axis of said trough thereby to cause said particles to move in a curvilinear path whereby different individual particles become coupled together to form spheroids of at least 1/32″, the length of at least one of said supports being variable to vary the inclination of said trough, the surface of said trough on which said soap is supported and along which it will be pelletized by the movement imparted thereto by the rotary movement thereof is imperforate.

6. Apparatus for pelletizing water-insoluble hydrophobic metallic soap of saturated fatty acid of 12–18 carbon atoms, said soap being in such finely divided condition that at least 90% by weight thereof is passable through a 200 mesh screen comprising an inclined elongated trough for supporting said soap to be pelletized, a plurality of rotatable heads spaced from each other, means for simultaneously rotating said heads at the same speed and including a plurality of rotatable shafts respectively connected to said heads for driving them, a plurality of supports, the upper ends of said supports connected to said trough, the lower ends of said supports respectively connected to said heads, the longitudinal center lines of said supports being spaced from the longitudinal center lines of said shafts, the length of at least one of said supports being variable to vary the inclination of said trough, the surface of said trough on which said soap is supported and along which it will be pelletized by the movement imparted thereto by the rotary movement thereof is imperforate.

7. Apparatus for pelletizing water-insoluble hydrophobic metallic soap of saturated fatty acid of 12–18 carbon atoms, said soap being in such finely divided condition that at least 90% by weight thereof is passable through a 200 mesh screen comprising an inclined elongated trough for supporting said soap to be pelletized, a pair of vertically disposed rotatable shafts spaced from each other, means for supporting said shafts, a horizontal rotatable shaft carried by said means and supported thereby, means operatively connecting said pair of shafts to said last mentioned shaft for rotating said pair of shafts upon rotation of said horizontal shaft, a head coupled with each of said vertical shafts and connected thereto for rotation therewith, a plurality of revolvable vertical supports, means for connecting said vertical supports to said respective heads, said last mentioned means being adustable for varying the distance between the vertical axes of said vertical supports and said heads to vary the diameter of revolution of said vertical supports upon rotation of said heads, means for connecting said vertical supports to said trough, the length of at least one of said supports being variable for varying the inclination of said trough, the surface of said trough on which said soap is supported and along which it will be pelletized by the movement imparted thereto by the rotary movement thereof is imperforate.

References Cited in the file of this patent

UNITED STATES PATENTS

| | | |
|---|---|---|
| 497,343 | Rasch | May 16, 1893 |
| 1,265,267 | Simpson | May 7, 1918 |
| 2,465,343 | Battista | Mar. 29, 1949 |
| 2,541,165 | Kulp et al. | Feb. 13, 1951 |
| 2,553,714 | Lucas | May 22, 1951 |
| 2,620,345 | Dean | Dec. 2, 1952 |
| 2,758,123 | Mason et al. | Aug. 7, 1956 |
| 2,786,772 | Stewart et al. | Mar. 26, 1957 |
| 2,803,038 | Holland et al. | Aug. 20, 1957 |
| 2,950,819 | Holman et al. | Aug. 30, 1960 |
| 2,986,772 | Patton et al. | June 6, 1961 |

FOREIGN PATENTS

| | | |
|---|---|---|
| 656,567 | Germany | Feb. 9, 1938 |
| 51,416 | Netherlands | Nov. 15, 1941 |

UNITED STATES PATENT OFFICE
CERTIFICATE OF CORRECTION

Patent No. 3,171,159          Dated March 2, 1965

Inventor(s) Joseph Cunder et al.

It is certified that error appears in the above-identified patent and that said Letters Patent are hereby corrected as shown below:

Column 7, line 53, after "imperforate" cancel the comma: line 54, beginning with "the surface" cancel all to and including "is imperforate" in line 57, same column 7; same column 7, line 75, after "trough" insert -- , the surface of said trough on which said soap is supported and along which it will be pelletized by the movement imparted thereto by the rotary movement thereof is imperforate --.

Signed and sealed this 20th day of July 1971.

(SEAL)
Attest:

EDWARD M. FLETCHER, JR.          WILLIAM E. SCHUYLER, JR.
Attesting Officer                Commissioner of Patents